(12) United States Patent
Rahman

(10) Patent No.: US 7,412,121 B2
(45) Date of Patent: Aug. 12, 2008

(54) NANOPHOTONIC INTEGRATED CIRCUIT AND FABRICATION THEREOF

(75) Inventor: Anis Rahman, Hummelstown, PA (US)

(73) Assignee: Applied Research and Photonics, Inc., Hummelstown, PA (US)

( * ) Notice: Subject to any disclaimer, the term of this patent is extended or adjusted under 35 U.S.C. 154(b) by 173 days.

(21) Appl. No.: 11/335,110

(22) Filed: Jan. 19, 2006

(65) Prior Publication Data

US 2006/0158230 A1 Jul. 20, 2006

Related U.S. Application Data

(63) Continuation-in-part of application No. 10/605,638, filed on Oct. 15, 2004, now Pat. No. 7,110,627, and a continuation-in-part of application No. 10/710,303, filed on Jul. 1, 2004.

(60) Provisional application No. 60/593,508, filed on Jan. 20, 2005, provisional application No. 60/481,056, filed on Jul. 3, 2003, provisional application No. 60/420,763, filed on Oct. 24, 2002.

(51) Int. Cl.
*G02B 6/12* (2006.01)
(52) U.S. Cl. ..................................... 385/14
(58) Field of Classification Search .............. 385/14, 385/37, 18, 129
See application file for complete search history.

(56) References Cited

U.S. PATENT DOCUMENTS

| | | | |
|---|---|---|---|
| 4,973,429 A | 11/1990 | Decher et al. ............... 252/587 |
| 5,208,111 A | 5/1993 | Decher et al. ............... 428/420 |
| 5,546,483 A | 8/1996 | Inque et al. .................... 385/14 |
| 5,560,929 A | 10/1996 | Hedstrand et al. ............ 424/486 |
| 5,694,408 A * | 12/1997 | Bott et al. ....................... 372/6 |
| 5,703,974 A | 12/1997 | Sasaki et al. ................... 385/14 |
| 5,863,809 A | 1/1999 | Koren .......................... 438/22 |
| 5,966,481 A | 10/1999 | Jolley et al. ................... 385/28 |
| 6,051,372 A | 4/2000 | Bayerl et al. .................... 435/4 |
| 6,052,220 A | 4/2000 | Lawrence et al. ......... 359/341.1 |
| 6,188,818 B1 | 2/2001 | Han et al. ..................... 385/24 |
| 6,224,667 B1 | 5/2001 | Kato ........................... 117/84 |
| 6,413,891 B1 | 7/2002 | Cho et al. ...................... 501/41 |
| 6,538,805 B1 | 3/2003 | Norwood et al. ......... 359/341.5 |
| 6,640,040 B2 | 10/2003 | Bayramian et al. .......... 385/131 |
| 6,650,816 B2 | 11/2003 | Bazylenko et al. .......... 385/129 |

(Continued)

OTHER PUBLICATIONS

K.M.A. Rahman, C.J. Durning, N.J. Turro and D.A. Tomalia; "Adsorption of Poly(amido amine) Dendrimers on Gold"; Langmuir2000, vol. 16; pp. 10154-10160, no month, year 2000.

(Continued)

*Primary Examiner*—Quyen P Leung

(57) ABSTRACT

A class of nanophotonic integrated circuit (nPIC) has been disclosed that is a platform technology for fiberoptic communication and computing, that is fabricated from waveguides that are based on natural index contrast (NIC) principle. A multifunctional nPIC and its fabrication details have been described. The nPIC is also known as an "optical processor". A novel nanomaterial "dendrimer" is highlighted as the key ingredient that enables the fabrication of the nPICs and its multifunctionality from the same basic process. Other nanomaterials such as spin-on glass, nano-silica sol, and a combination of any of these materials can also be used via the natural index contrast method. Several preferred embodiments of the nPIC are described.

23 Claims, 13 Drawing Sheets

Fig. 1

U.S. PATENT DOCUMENTS

| | | | |
|---|---|---|---|
| 6,720,093 B2 | 4/2004 | Samuel et al. | 428/690 |
| 6,769,274 B2 | 8/2004 | Cho et al. | 65/386 |
| 6,859,574 B2 | 2/2005 | Doerr et al. | 385/17 |
| 2001/0033715 A1 | 10/2001 | Delisle et al. | 385/37 |
| 2003/0099425 A1 | 5/2003 | Grubb et al. | 385/14 |
| 2003/0234978 A1 | 12/2003 | Garito et al. | 359/341.5 |
| 2004/0033004 A1* | 2/2004 | Welch et al. | 385/14 |
| 2004/0067006 A1 | 4/2004 | Welch et al. | 385/14 |
| 2004/0105476 A1 | 6/2004 | Wasserbauer | 372/50.22 |
| 2004/0105610 A1 | 6/2004 | Rahman | 385/14 |
| 2005/0002628 A1* | 1/2005 | Rahman et al. | 385/129 |

OTHER PUBLICATIONS

K.M. Anis Rahman, Christopher J. Durning and Nicholas J. Turro; "Molecular Dynamics of PAMAM Dendrimers"; http://dwdm2.home.comcast.net/p-amamdynamics.pdf, no date.

Dendritic Nano Technologies website at http://dnanotech.com/properties.html, May 2004.

Larry R. Dalton; "Polymeric and Dendritic Electro-Optic Materials: Materials Issue"; University of Washington; Seattle, Washington 98185-01700, no date.

Huang, Weibin and Syms, Richard R.A.; "Analysis of folded Erbium-doped planar waveguide amplifiers by the method of lines"; Journal of Lightwave Technology; Dec. 1999; pp. 2658-2664; vol. 17 Issue No. 12.

Otomo, Akira et al.; "Stimulated emission in dendrimer-doped polymer waveguides"; Thin Solid Films; 2001; pp. 278-283; vol. 393, no month abstract only.

Ari, Murat et al.; "Analysis of Erbium doped fiber amplifier"; Ankara University; Turkey, no date.

Vermelho, M.V.D. et al.; "Simple and accurate procedure for modeling Erbium-doped waveguide amplifiers with high concentration"; Journal of Lightwave Technology; Mar. 2000; pp. 401-408; vol. 18 Issue No. 3.

Chryssou, C.E. et al.; "Improved gain performance in Yb3+-sensitized Er3+-doped alumina (Al2O3) channel optical waveguide amplifiers"; Journal of Lightwave Technology; Mar. 2001; pp. 345-349; vol. 19 Issue No. 3.

Sainai, Sajan et al.; "Index contrast scaling for optical amplifiers"; Journal of Lightwave Technology; Oct. 2003; pp. 2368-2376; vol. 21 Issue No. 10.

Claire Pitois, Robert Vestberg, Marlene Rodlert, Eva Malmstrom, Anders Hult, Mikael Lindgren; "Fluorinated dendritic polymers and dendrimers for waveguide applications"; Optical Materials; vol. 21, pp. 499-506; 2002, no month.

Akira Otomo, Sonoko Otomo, Shiyoshi Yokoyama, Tatuso Nakahama, Shinro Mashiko; "Remarkable optical properties of dendrimers for laser applications"; Linear and Nonlinear Optics of Organic Materials; Manfred Eich and Mark G. Kuzyk—Editors; Proceedings of SPIE; vol. 4461; pp. 180-187; 2001, no month.

Alex K. Y. Jen, Hong MA, Takafumi Sassa, Sen Liu, S. Suresh, Larry R. Dalton, and Marnie Haller; "Highly efficient and thermally stabler organic/polymeric electro-optic materials by dendritic approach"; Linear and Nonlinear Optics of Organic Materials; Manfred Eich and Mark G. Kuzyk—Editors; Proceedings of SPIE; vol. 4461; pp. 172-179; 2001, no month.

Pr. Gero Decher; "L'Interfacage Macromoleculaire: Nouveaux Materiaux par Nanoassemblage"; Conference du Mercredi; 12 Fevrier 2003, 1 page, Feb. 2003.

Y. Inoue, A. Himeno, K. Moriwaki, M. Kawachi; "Silica-based arrayed-waveguide grating circuit as optical splitter/router"; Electronics Letters; vol. 31; No. 9; pp. 726-727; Apr. 27, 1995.

H. Bissessur, B. Martin, R. Mestric, and F. Gaborit; "Small-size, polarization-independent phased-array demultiplexers on InP"; Electronics Letters; vol. 31; No. 24; pp. 2118-2120; Nov. 23, 1995.

T. Brenner, C.H. Joyner and M. Zirngibl; "Compact design waveguide grating routers"; Electronics Letters; vol. 32; No. 18; pp. 1660-1661; Aug. 29, 1996.

M. Zirngibl, C.H. Joyner and J.C. Centanni; "Size reduction of waveguide grating router through folding back the input/output fanouts"; Electronics Letters, vol. 33; No. 4; pp. 295-297; Feb. 13, 1997.

Hideaki Okayama, Masato Kawahara and Takeshi Kamijoh; "Reflective Waveguide Array Demultiplexer in LiNbO3"; Journal of Lightwave Technology; vol. 14; No. 6; pp. 985-990; Jun. 1996.

K. Okamoto; *Fundamentals of Optical Waveguides*, Ch. 9; Academic Press, New York 2000, no month Ch 9 "Planar Lightwave Circuits", pp. 341-400.

C. Dragone; "An NxN Optical Multiplexer Using a Planar Arrangement of Two Star Couplers"; IEEE Photonics Technology Letters; vol. 3; No. 9; pp. 812-815; Sep. 1991.

\* cited by examiner

NANOPHOTONIC INTEGRATED CIRCUIT AND FABRICATION THEREOF

CROSS-REFERENCE TO RELATED APPLICATIONS

This application claims priority to U.S. Provisional Patent Application No. 60/593,508, filed Jan. 20, 2005 and is a 1) continuation-in-part of U.S. patent application Ser. No. 10/605,638, filed Oct. 15, 2004, now U.S. Pat. No. 7,110,627, issued on Sep. 19, 2006, which was published as US 2004/0105610 on Jun. 3, 2004 and which claims priority to U.S. Provisional Patent Application No. 60/420,763, filed on Oct. 24, 2002; and 2) continuation-in-part of U.S. patent application Ser. No. 10/710,303, filed Jul. 1, 2004, which was published as US 2005/0002628 on Jan. 6, 2005 and which claims priority to U.S. Provisional Patent Application No. 60/481,056, filed on Jul. 3, 2003.

FIELD OF THE INVENTION

The present invention is directed to a nanophotonic integrated circuit and more particularly to a multifunctional nanophotonic integrated circuit (nPIC) and devices based on the nPIC.

BACKGROUND OF THE INVENTION

An integrated circuit (IC) is a microelectronic device that houses multiple electronic circuits on a chip. ICs are built by lithographic fabrication of numerous transistors on a silicon chip. Similarly a photonic IC (PIC) is a device that houses integrated photonic functions on a chip. A PIC fabricated from nanomaterials and/or via a nanolithography process is called a nanophotonic integrated circuit. Although the physics of photons (neutral particles) and electrons or holes (charge carrying particles) are different from each other, the evolution of the electronic IC provides an analogy to PICs. The development of PICs promises to increase functionality, density, and significantly reduced cost when compared to optical components that are assembled from discrete photonic elements. While there are several existing methods for designing and building fiberoptic networks and systems, the fundamental breakthrough required to meet dramatically reduced cost points is the introduction of viable PIC technology that must meet a few important criteria such as:

(i) PIC technology must be capable of creating a broad range of optical functions out of a single fabrication process.

(ii) The means must exist for PICs to be readily manufactured at low cost in high volume.

(iii) The capability must be developed to aggregate individual optical functions into more complex arrangements within the PIC technology and with other optical technologies.

While classical electronic computing has made significant advances to the modern generation of fast computers and the Internet, there are currently applications needs that require even faster speed, higher bandwidth, more robust deployment capability and cheaper methods of fabrication. In the field of photonics, efforts to achieve a true integrated platform for fiberoptic communication and computing that can parallel the electronic counterpart have been unsuccessful. Many of the optical components available today, whether passive, active, or hybrid combinations of the both, are analogous to the vacuum tubes that predate the modern transistors and ICs. This is primarily because silicon, as an optical material, poses several challenges that make it almost impossible to produce a true PIC that can replicate the IC revolution. These issues are fundamental limitations that arise from material properties, and result in difficulty of externally controlling.

Silicon structures are difficult to control externally for optical switching. Poor light emission from silicon devices is attributed to silicon's indirect band gap. It is difficult to obtain optical amplification with silicon because of difficulty in doping silicon with amplifying ions. It is also difficult to fabricate modulators because of silicon's low electro-optic coefficient. Therefore, there is an expressed need to develop novel devices that can overcome the limitations of silicon-based photonics. Novel materials and novel methods are necessary for enhancing the interaction of light with matter. Devices with novel functionalities for guiding light, switching, amplifying, and modulating need to be developed. In addition, a long awaited need is the ability to combine electronics with photonics by fabricating PICs on a silicon wafer. Such devices will form the basis for an ultimate photonic integrated circuit. If a smart nanomaterial is used to build such a PIC, it is termed as an nPIC. In the field of photonics, a smart material is defined as a material that can provide multiple functionalities such as waveguiding, amplifying, and modulating of photonic signals For a truly integrated photonic technology, a smart material system is necessary that functions in a similar fashion for photonics, as silicon does for electronic IC. At the fundamental level, electronic IC requires only a periodic arrangement of numerous "transistors" (or p-n junctions) in a smaller dimension. Because IC functionality depends primarily on the movement of charge carriers, the features necessary to carry out these functionalities can be as small as lithographically possible, the latest being a 90 nm line width.

Contrasting this with photonics, features suitable for photon guiding and coupling must first be able to accommodate the photons. As a result the waveguides must at least be of the order of the wavelength of the photon. This requirement is, in some aspects, an advantage for photonics because lithographic processes are readily available. On the other hand there exists a new set of challenges to overcome because of the difficulties with silicon material properties explained above, and because of the fact that silicon cannot do everything necessary for photon manipulations. Hence, the need for a new material-based technology.

From a fundamental point of view the basic functionalities necessary to build a chip that can ultimately be termed as an "optical processor" include the following: light guiding, light amplifying, light modulating, signal processing, attenuating, sensing, on-chip light source and detector, on-chip interconnect, and inputting and outputting of the signal. Being able to build all of these functionalities on a single chip that would represent a true PIC is an ambitious goal. Nevertheless, this is what one must achieve to make a breakthrough, not only from a scientific and technology point of view, but also to be able to solve the problems that currently exist.

The term "photonic integrated circuit" has been assigned to several different kinds of chip-based devices. For example, U.S. Pat. No. 5,863,809 (Jan. 26, 1999) titled "Manufacture Of Planar Photonic Integrated Circuits," describes integration of a laser (active) waveguide with a passive waveguide in a coplanar configuration. As another example, U.S. Pat. No. 5,703,974 (Dec. 30, 1997) titled "Semiconductor Photonic Integrated Circuit And Fabrication Process Therefor," describes InP based photonic integrated circuit wherein an active region and a passive region are coupled. Other examples of using the term photonic integrated circuit in one form or other can be found in US Pat. App. No. 2004/0067006 A1 (Apr. 08, 2004) titled "Transmitter photonic integrated circuit (TXPIC) chips," in US Pat. App. No. 2003/0099425 A1 (May 29, 2003) titled "Optical Communication Module With One or More Photonic Integrated Circuit (PIC) Chips and an External Booster Optical Amplifier for Photonic Integrated Circuits," in U.S. Pat. No. 6,224,667 (May 01, 2001) titled "Method for Fabricating Semiconductor Light Integrated Circuit," and in US Pat. App. No. 2004/0105476 A1 (Jun. 03, 2004) titled "Planar Waveguide Surface Emitting Laser and Photonic Integrated Circuit."

In general, the term PIC has been used for any photonic device that accommodated optical functionality on a chip. It is apparent that, while the term PIC has been used for a number of years, devices based on those PICs are not in wide use in practical network equipment. The primary reason is the typical unfavorable cost and performance issues of the available PIC devices that need to be improved. Also the above referenced PICs lack features to be able to term them as a complete PIC or an optical processor.

SUMMARY OF THE INVENTION

The present invention discloses a nanophotonic integrated circuit (nPIC) that has several distinctions. The waveguides, that are used to fabricate the nPIC, can be made from nanomaterials, e.g., dendrimer and dendrimer compositions, nano-silica sol, spin-on-glass and its compositions, etc. The waveguiding functionality is engineered by the natural index contrast (NIC) principle that is described in a previous invention (see U.S. patent application Ser. No. 10/710,303 (Jun. 03, 2004) titled "Novel Photonic Waveguide Structures for Chip-Scale Photonic Integrated Circuit"). The nPIC integrates multiple functionalities such as amplification, mux/demux, and modulation on a single chip via on-chip monolithic waveguide interconnects.

The present invention is directed to a nanophotonic integrated circuit comprising an input section, an amplifier section and a multiplexing/demultiplexing unit arranged on a substrate. The input section has a plurality of input waveguides and a coupler portion for coupling two of the plurality of input waveguides to the amplifier section. The remaining input waveguides are connected to the multiplexing/demultiplexing unit, or alternately, to a modulator portion. The amplifier section is comprised of a continuous folded waveguide connected at a first end to the coupler portion of the input waveguide and connected at a second end to the multiplexing/demultiplexing unit.

The multiplexing/demultiplexing unit has a plurality of input/output waveguides, a slab waveguide, an array waveguide, and a reflective mirror. The plurality of input/output waveguides are arranged for simultaneously inputting at least one signal to and outputting at least one signal for demultiplexing a multiplexed optical signal in to n different constituent wavelengths and for combining n input optical signals composed of n different constituent wavelengths in to a multiplexed signal. A slab waveguide has a first end and a second end, the first end coupled to the plurality of input/output waveguides to focus at least one input signal to the second end, and the second end coupled to an array waveguide, for focusing the at least one output signal to the input/output interface through the first end. The array waveguide has a plurality of waveguides for coupling the one or more input signals, separating the one or more input signals into the n different constituent wavelengths and focusing the n different constituent wavelengths back on to the slab waveguide first end coupling to the input/output interface. The plurality of waveguides of the array waveguide are optically coupled at one end with the second end of the slab waveguide, and terminated at an opposing end of the array waveguide by a reflective mirror. Each waveguide of the array waveguide has a predetermined path difference between successive waveguides. A reflective mirror is fabricated at the opposing end of the array waveguide for reflecting the one or more signals. The present invention also includes an external array interface portion attached to the input section, for connecting external fibers for input and output of signals to the nPIC.

In a preferred embodiment, the present invention also includes a modulator array portion comprised of at least one modulator configured to modulate at least one input/output signal from the input/output waveguides. The modulators in the modulator array portion may be electro-optic phase modulators configured so that an electric excitation can be applied across the waveguide over a predetermined length; or amplitude modulators of the Mach Zehnder configuration. The modulator array portion may include both phase- and amplitude-modulator types. It may also include an electro-absorption type modulator.

In another embodiment of the present invention, a nanophotonic integrated circuit comprises an input section, an amplifier section and a splitter section arranged on a substrate. The input section is configured to connect an input signal to the amplifier section, and the amplifier section is configured to amplify the input signal and transmit the amplified input signal into an input of the splitter section. The splitter section is coupled to a plurality of output channels configured to split the amplified input signal into a plurality of output signals of N branches. The circuit optionally includes a modulator section, wherein the modulator section is configured to modulate the plurality of output signals.

The present invention is also directed to a method for tuning the wavelength ranges for amplification in an optical circuit, comprising doping dendrimer with rare-earth ions; and dissolving erbium (III) nitrate pentahydrate in a solution of the dendrimer and methanol and amplifying light waves in the 1500-1600 nm range.

An advantage of the present invention is the ability to provide a monolithically integrated, nanophotonic chip incorporating functionality for light guiding, light amplifying, light modulating, signal processing, attenuating, sensing, on-chip light source and detector, on-chip interconnect, and inputting and outputting of the signal, and combinations thereof.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The invention is described below by way of examples with reference to the accompanying drawings, throughout which like parts are referred to by like references, where in.

DETAILED DESCRIPTION OF THE INVENTION

In the following description, reference is made to the accompanying drawings that form a part thereof, and in which is shown by way of illustration specific exemplary embodiments in which the invention can be practiced. These embodiments are described in sufficient detail to enable those skilled in the art to practice the invention. It is to be understood that other embodiments can be utilized and that changes can be made without departing from the scope of the present invention.

Figure 1:
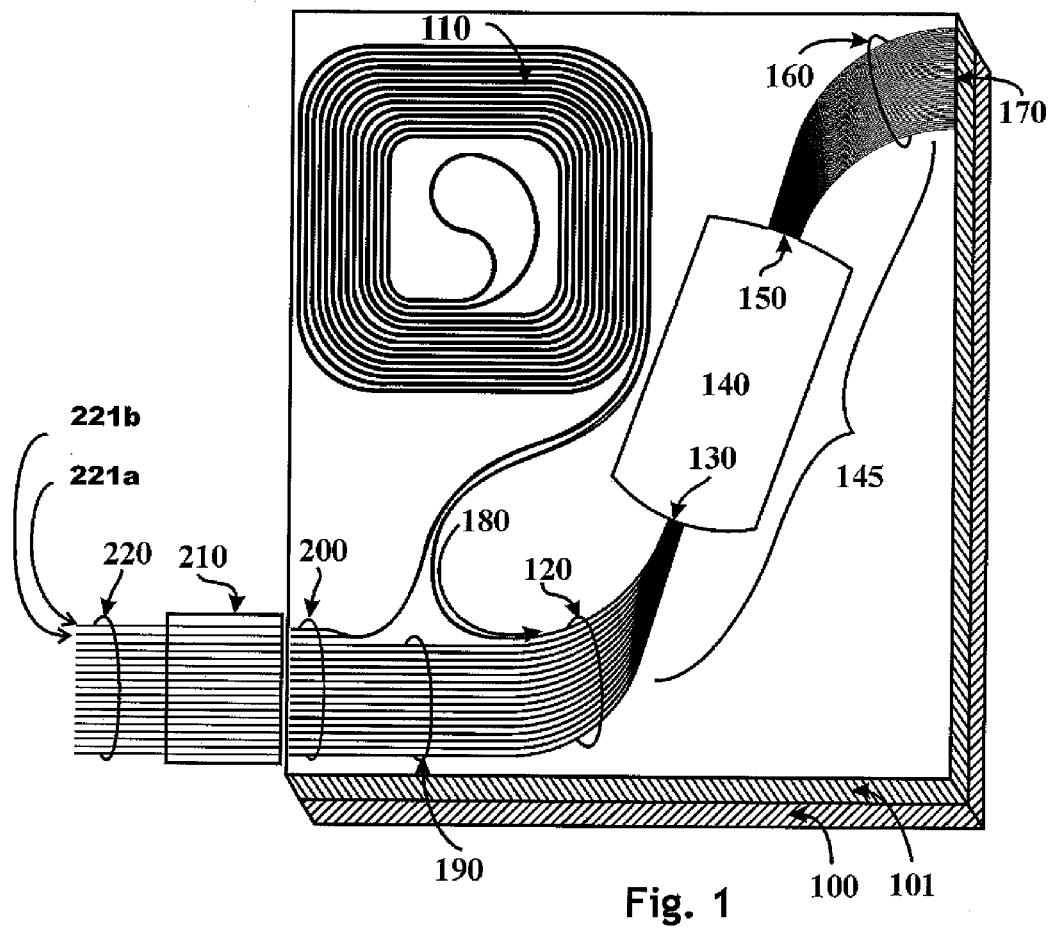
FIG. 1 is a schematic diagram illustrating the overall structure of the nPIC of the present invention.

FIG. 1 provides a diagrammatic representation of the overall structure of a preferred embodiment of the nPIC. A substrate 100 is preferably made from prime grade <100> silicon, on which a layer of oxide 101 is formed by either thermal oxidation or from a spin-on glass via spin coating and curing the subsequent film at a suitable temperature that may range from room temperature to a few hundreds of degrees of Celsius. Several photonic functionalities are provided via different segments: an amplifier section 110; a multiplexing/demultiplexing section by means of a reflective arrayed waveguide grating 145 (see, generally, FIG. 4; the reflective arrayed waveguide grating is described in detail in commonly-assigned U.S. patent application Ser. No. 10/605,638 filed Oct. 15, 2003, entitled Reflective Arrayed Waveguide Grating, and the same is hereby incorporated by reference in its entirety); a modulation section 190; and an external fiber-array interface 210.

Figure 3:
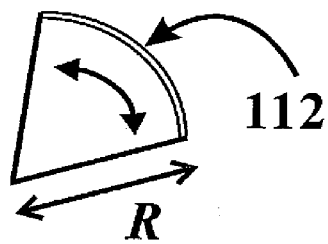
FIG. 3 is a diagram of the radius of curvature of the waveguide bend in FIG. 2.
Figure 2:
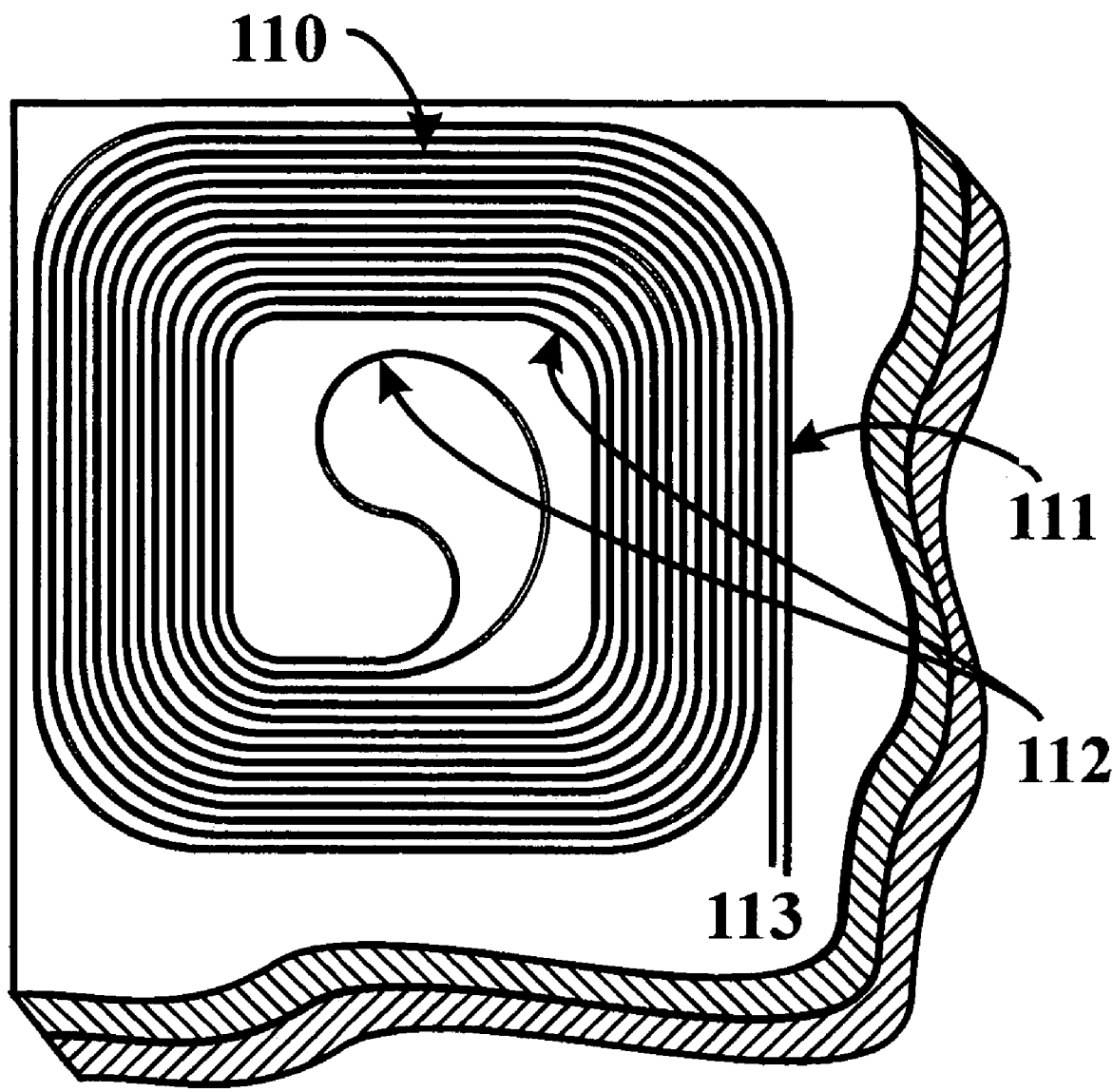
FIG. 2 is a diagram of the amplifier section of the nPIC in FIG. 1.

The amplifier section 110, shown separately in FIG. 2, includes a folded waveguide that begins at the point 113, which is composed of a plurality of straight segments 111 and a curved segment 112, the curved segment having a minimum radius of curvature R as shown in FIG. 3. The core of the amplifier is made with a nanomaterial such as dendrimer that is doped with rare-earth ions such as $Er^{3+}$ and/or other amplifying ions.

The value of the radius of curvature R, also called the bend radius, is a critical parameter. A minimum value of R is necessary for a transmission with minimal loss. The optimal value of R is material dependent and depends on material characteristics; for glassy materials it is usually ~4-5 mm. For novel polymeric materials such as dendrimer, a lower value can be used to design an efficient amplifier. This value may range between 1-6 mm; however, a higher or lower value of R may also be used for some other materials and design.

Figure 4:
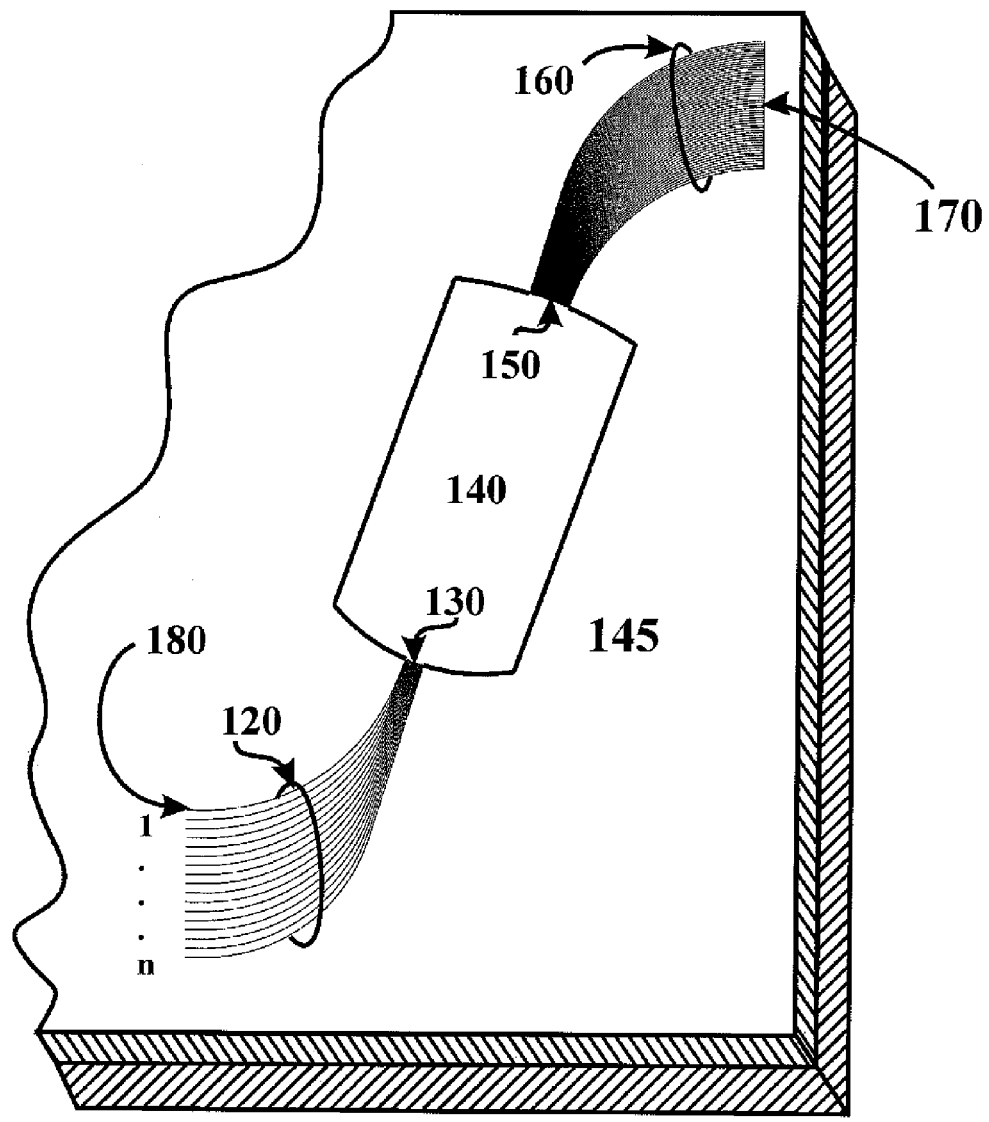
FIG. 4 is a schematic diagram of the reflective arrayed waveguide grating (RAWG) section of the nPIC in FIG. 1.

Referring next to FIG. 4, the RAWG multiplexing/demultiplexing (mux/demux) unit 145 is fabricated on the same substrate. The RAWG 145 is composed of an input/output array 120, a slab waveguide 140, an array of waveguides 160 acting as a grating, and the said array of waveguides is terminated by a mirror 170 to reflect the input signal back into the array of waveguides 160. The array of waveguides 160 acts as a grating to split the wavelengths of the input signal 221b or 180 (see also paragraph 69) into its constituent wavelengths $\lambda 1, \lambda 2, \ldots, \lambda n$ that are focused on the individual output waveguides at the slab-waveguide interface 130.

Figure 5:
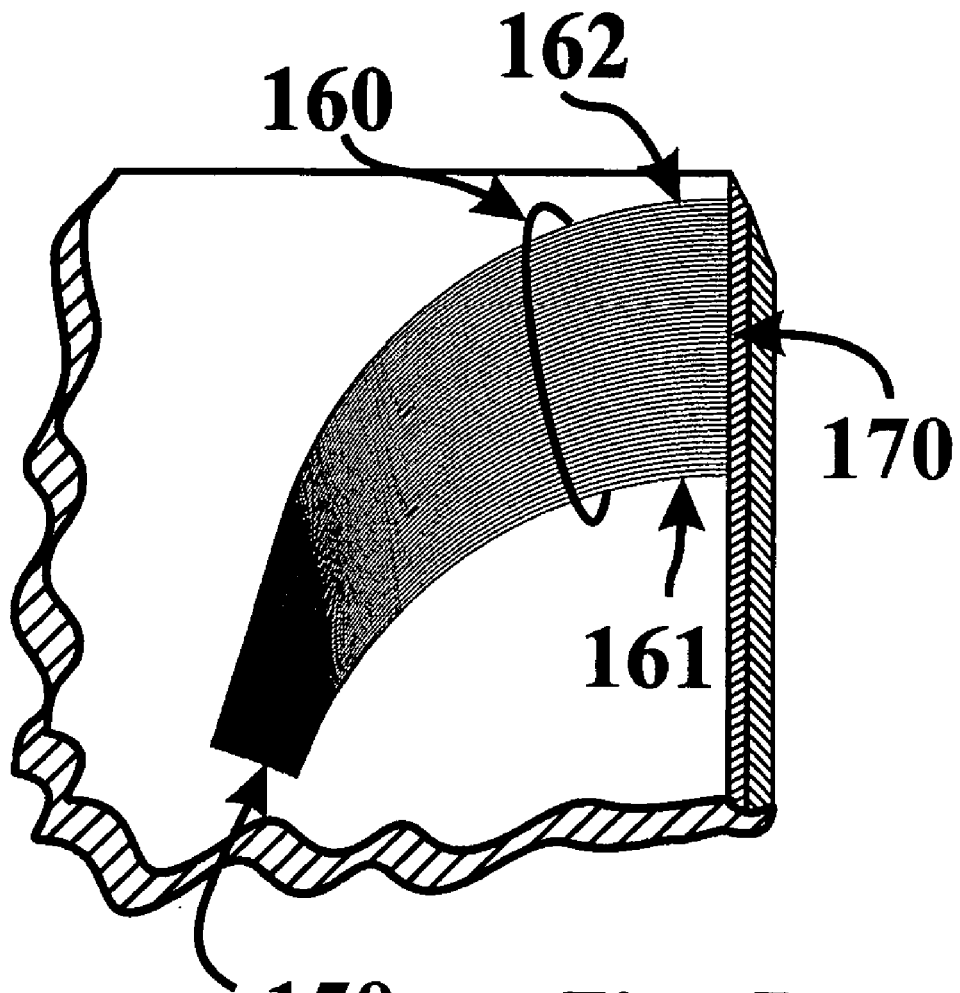
FIG. 5 is a schematic diagram of the array of waveguides portion of the nPIC and the RAWG in FIGS. 1 and 4.

Referring next to FIG. 5, the grating portion of the nPIC is formed by an array of waveguides 160. The total length of each successive waveguide in the array differ by a length of $\Delta 1$ from the nearest neighbor; the inner waveguide 161 being the shortest waveguide and the outer waveguide 162 being the longest waveguide in the array of waveguides 160. Both ends of the individual waveguides in the array of waveguides 160 have a taper to help couple the most light in and out of the grating formed by the array of waveguides 160.

Figure 6:
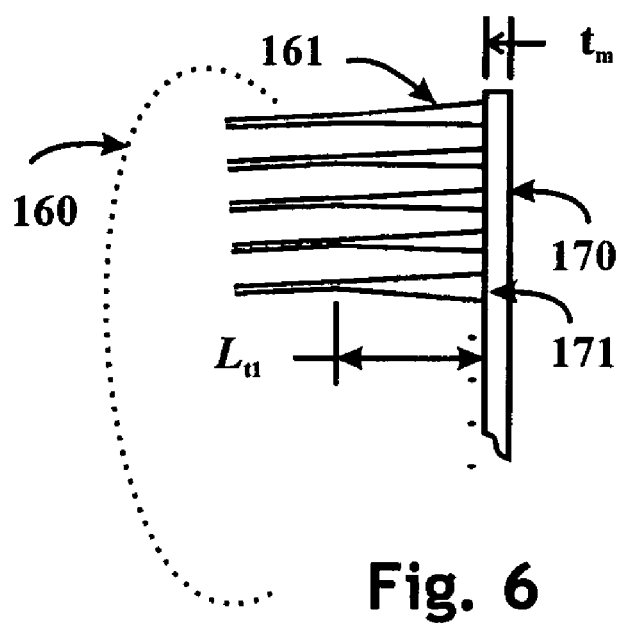
FIG. 6 is a schematic diagram of the waveguide termination with a reflective mirror of the array of waveguides of the RAWG.

FIG. 6 shows a magnified view of a portion of the array of waveguides 160 terminating at the mirror 170. The mirror 170 is created by depositing a high reflectivity material such as gold or silver whose thickness, $t_m$, 171 usually has a value of ~10 micron. The taper length $L_{t1}$, and the shape of the taper are optimized such that light coupling is maximized and yet complies with practical lithographic dimensions. Usually a linear taper shape is chosen to simplify geometry and for process convenience, but other shapes such as parabolic, exponential, hyperbolic, or a combination of any of the above, can also be used.

Figure 7:
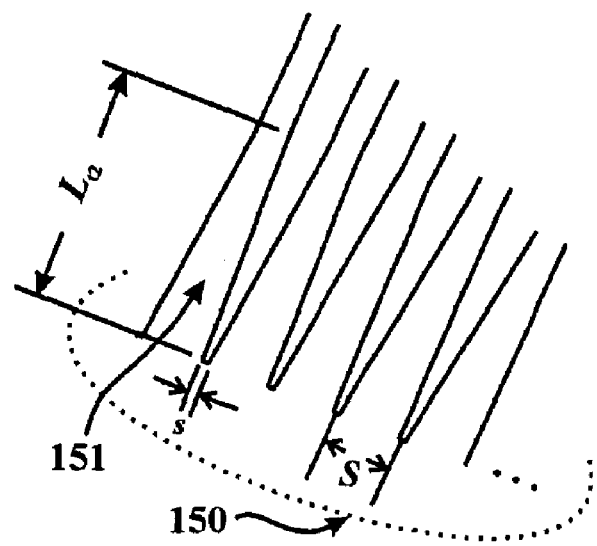
FIG. 7 is an illustration of the waveguide taper of the input end of the array of waveguides of the RAWG.

Similarly, the input ends 150 of the array of waveguides 160 interfacing with the slab 140 also have a taper 151 that is designed for optimum performance (see FIG. 7). Here the inter-waveguide separations, distance between adjacent waveguides s, taper length $L_{t2}$, as well as the taper shape is optimized as design parameters where individual numeric values depend on the total length of the shortest waveguide in the array of waveguides 160, the refractive indices of the core and the cladding material, and the total number of channels of the device.

Figure 8:
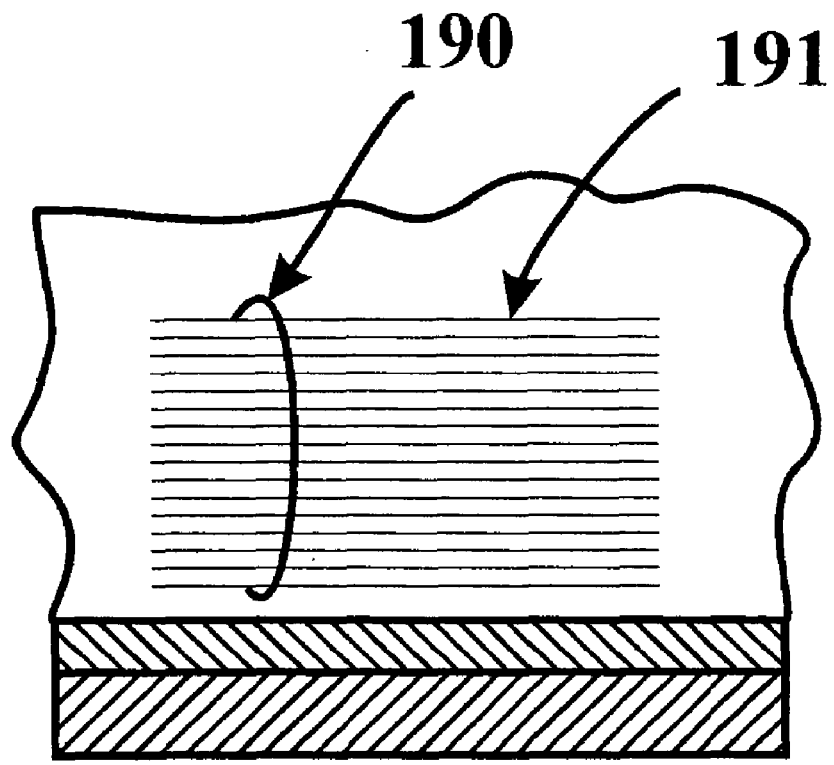
FIG. 8 is a diagram of the modulation section of the nPIC in FIG. 1.

Referring to FIG. 8, the modulation segment 190 of the nPIC includes a plurality of individual modulators 191 used for each output channel. All of the modulators in the array of modulation segment 190 may have identical or non-identical structure, allowing a design flexibility to accommodate the requirements of multiple services involving different modulation frequencies and/or signal encoding on a single chip.

Figure 9:
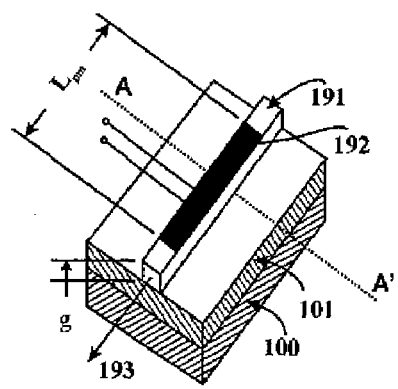
FIG. 9 is a fragmentary sectional view of the electro-optic phase modulator section.

FIG. 9 shows the construction details of an electro-optic phase modulator. The waveguide that comprises each of the plurality of individual modulators 191 is the same as all other waveguides from which the nPIC is constructed with the exception that here a top and a bottom electrode 192 have been deposited (see FIG. 10) such that an electric excitation can be applied across the waveguide over a length $L_{pm}$. Each waveguide of the individual modulators 191 has a core 193.

Figure 10:
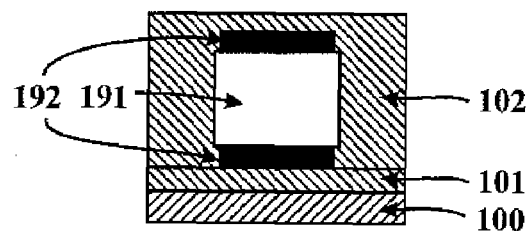
FIG. 10 shows the cross-section of a single waveguide with electrode arrangements along the AA' line in FIG. 9.

FIG. 10 shows the cross section of the phase modulator with electrodes through the line AA' in FIG. 9 wherein 102 is a cladding having the same index as 101. The effective separation between the top and the bottom electrodes, g, is determined by the thickness of the waveguide which typically is a few microns. The exact value will depend on a given design, e.g., a range of 2-8 microns for the present invention, but other values can be used by other designs as determined by the material used. The linear electro-optic effect, also known as the Pockels effect, describes the change of the refractive index of the waveguide under applied electric field. The change in the refractive index, Δn, is proportional to the electric field strength, its direction and the polarization of light. For a linearly polarized light, $$|\Delta n| = \frac{1}{2} n^3 r_{33} E_3, \qquad [1]$$

where, $r_{33}$ is the electro-optic coefficient of the core material and $E_3$ is the applied electric field in the z-direction (across the thickness of the waveguide). For a homogeneous electric field applied over a length $L_{pm}$, the change in phase of the guided light is given to the first approximation by, $$\Delta\phi = \frac{\pi L_{pm}}{\lambda} \cdot \frac{V}{g} \cdot n^3 r_{33} \Gamma, \qquad [2]$$

where, V is the applied voltage, λ is the wavelength, Γ is the efficiency of the field generated by the voltage V, whose value is less than 1 and π is a constant. The half-wave voltage, $V_\pi$, which causes a phase shift of π is given by, $$V_\pi = \frac{g\lambda}{n^3 r_{33} L_{pm} \Gamma}. \qquad [3]$$

As indicated by equation 3 above, the half-wave voltage is directly proportional to the electrode separation g and inversely proportional to the electrode length, $L_{pm}$; therefore, these geometry factors are optimized to obtain an optimum value of $V_\pi$ for a given material system that also simultaneously optimizes the chip size.

Figure 17:
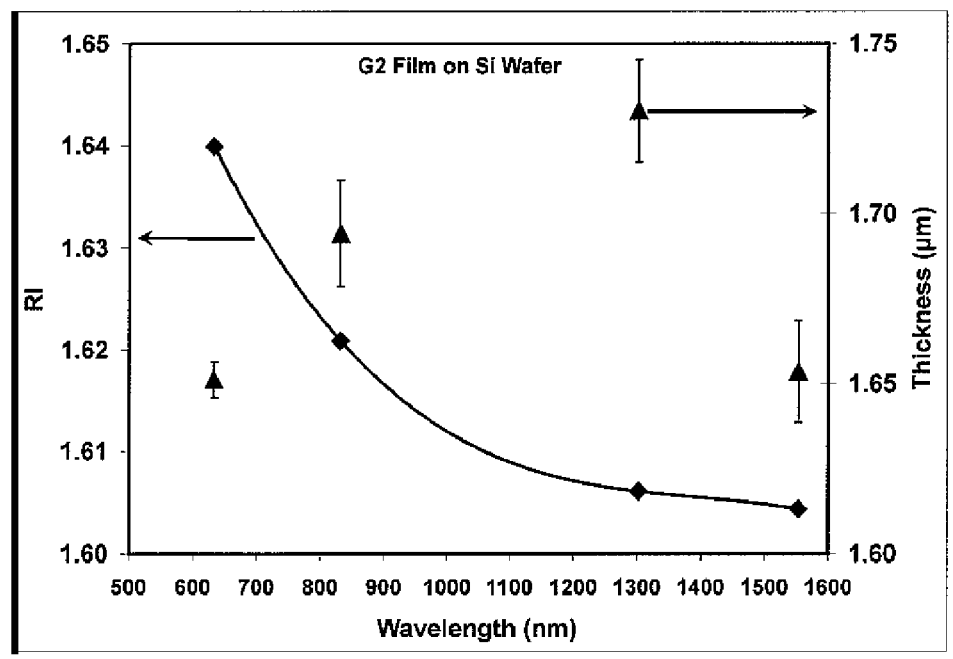
FIG. 17 shows the measured refractive index of PAMAM dendrimer G2 film as a function of wavelength.

Some special polymeric nanomaterials such as dendrimers have a refractive index in the range 1.5 to 1.6. For instance, the refractive index of a cured PAMAM dendrimer generation 2 (G2) film formed via spin coating on a silicon wafer and cured between 150° C. and 3000° C. for a length of time between half-hour and one hour was measured using a Metricon 2010 prism coupler (Metricon Corporation, Pennington, N.J. 08534USA). It was determined that the cured G2 film has a refractive index of 1.64 at 632.8 nm while it falls to 1.604 at 1553 nm (see FIG. 17). As shown in FIG. 17, there is a wavelength dependent dispersion of the refractive index. While a similar dispersion is expected for other waveguide materials (e.g., glass), however, here the variation between 1300 nm and 1600 nm is very small which can be accommodated within the design. An important observation here is that, if a glassy material is used as cladding with a refractive index $n_2$=1.46 and the G2 film ($n_1$=1.604) is used for core, a natural index contrast of $\Delta n=[(n_1-n_2)/n_2]\times 100\%=9.86\%$ is obtained which is suitable for guiding light in the 1.0-1.6 μm bands. Similarly, for PAMAMOS dendrimer was spun-on silicon wafer and cured via similar process as outlined above. The said film's refractive index was 1.5.

For some polymeric material that is optimized for electro-optic applications, $r_{33}$ can have a value on the order of 300 pm/V, while for other common materials such as lithium niobate $r_{33}$ is reported to be 33 pm/V. The value of Γ is also material dependent, and in part determined by the driving circuit 196 shown in FIG. 13; however, it increases with an increasing value of $r_{33}$. It is also evident from Equation (3) that higher the value of $r_{33}$, the lower the value of $V_\pi$. Since a lower value of $V_\pi$ is beneficial for system design and operation, therefore, as high a value of $r_{33}$ as possible is desirable. Table-I shows typical values of parameters in Equation (3) and corresponding values of a polymer whose $r_{33}$ is assumed to be 100 pm/V. Since polymer is deposited on to a substrate, its thickness can be controlled from fraction of a micron up to tens of microns; in Table-I a thickness of 5 micron is assumed.

TABLE I

Typical values for Equation [3].

| Parameter (Unit) | Polymer |
|---|---|
| λ (μm) | 1.5 |
| g (μm) | 5 |
| n | 1.6 |
| $r_{33}$ (μm/V) | 0.100 |
| $L_{pm}$ (μm) | 10 |
| Γ | 0.5 |
| $V_\pi$ (Volts) | 2.93 |

Figure 11:
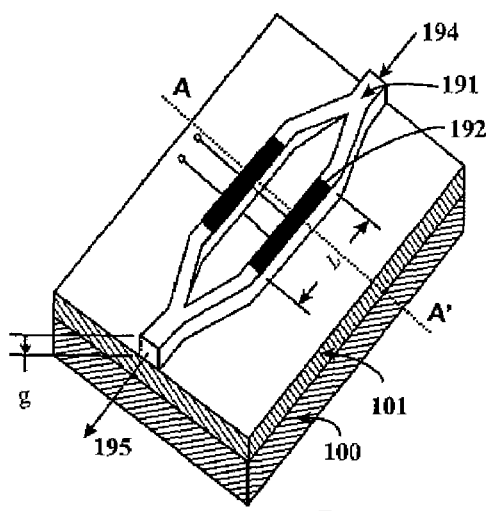
FIG. 11 is a fragmentary sectional view of the so called Mach-Zehnder configuration for amplitude modulation.
Figure 12:
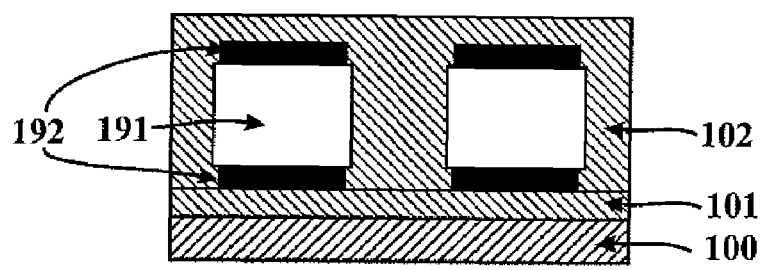
FIG. 12 shows the cross-section of a single Mach-Zehnder structure with electrode arrangements along the AA' line in FIG. 11.

FIG. 11 shows a so-called Mach-Zehnder structure (MZ) used for amplitude modulation whose cross-sectional view through the line AA' is shown in FIG. 12. Here a pair of phase modulators is used in parallel as the individual arms of the MZ to produce amplitude modulation. Each waveguide for each modulator has a core 194. As before, an external applied voltage creates a phase difference in both arms which causes a change in the power at the output end 195 due to the interference of signal carried in both arms. Here the transmittance of individual modulators can be controlled from a minimum power $P_{min}$ to a maximum $P_{max}$. The extinction ratio is given by $P_{min}/P_{max}$. The output power, $P_{out}$, can be controlled by the applied voltage V according to equation [4]:

$$P_{out} = P_{min} + (P_{max} - P_{min}) \cdot \left[\frac{1}{2} + \frac{1}{2}\cos\left(\frac{\pi(V-V_0)}{V_\pi}\right)\right] \qquad [4]$$

where $V_0$ is the voltage at peak power and other terms are as described before. The half-wave voltage can be thought of as a "switching" voltage because this is the minimum voltage required for switching the transmission state into the off state and vice versa.

Figure 13:
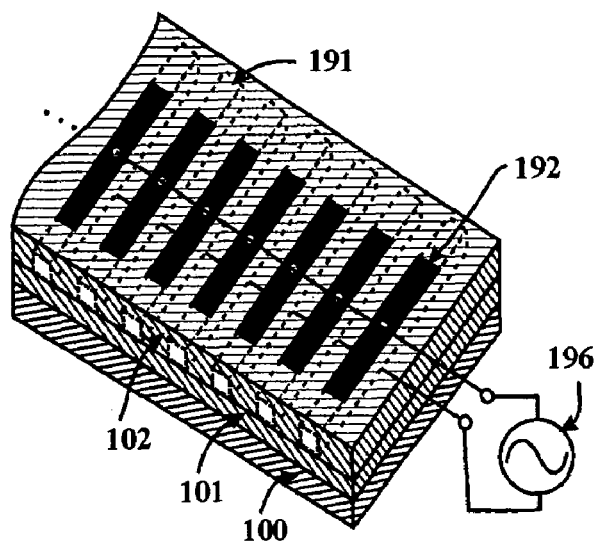
FIG. 13 shows a scheme of cascaded electrode structure of an array of electro-optic phase modulators.

FIG. 13 shows an array of phase modulators where a single source circuit 196 is used to power all branches (modulators)

in the array. If all modulators in the array have identical structure and excitation, they will produce the same modulation frequency.

Figure 14:
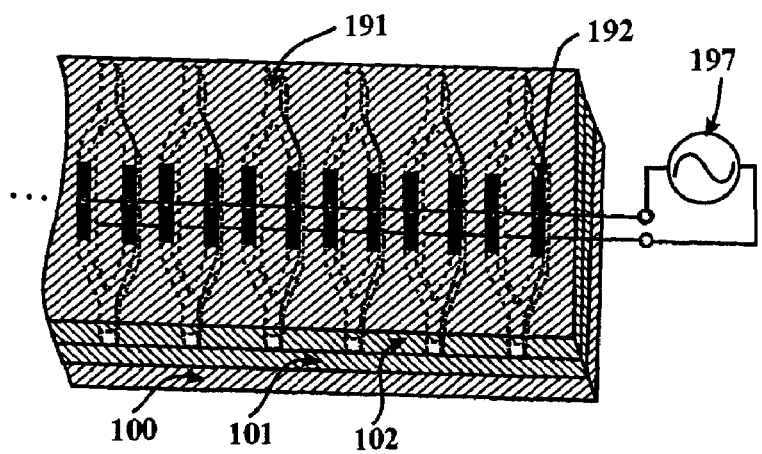
FIG. 14 shows a scheme of cascaded electrode structure of an array of Mach-Zehnder amplitude modulators.

FIG. 14 shows an array of amplitude modulators in the MZ configuration. Owing to their identical construction and by virtue of a single driving circuit 197 exerting an identical excitation to all branches, all output branches will have identical modulation frequency.

Figure 15:
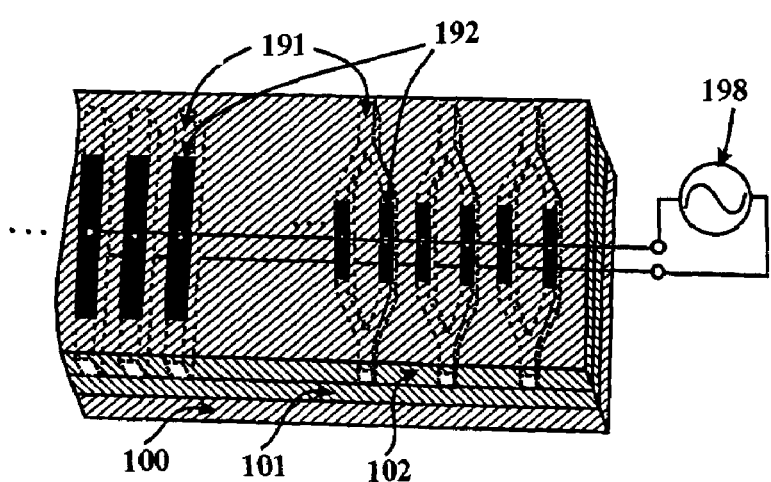
FIG. 15 shows a scheme of cascaded electrode structure of an array containing both phase modulators and Mach-Zehnder amplitude modulators.

FIG. 15 shows an array of modulators where phase modulators and amplitude modulators have been embodied on the same unit. Other combinations of different modulators are also possible which will be best determined and practiced according to the requirements of a particular application. The driving circuit 198 may be the same as 197 (FIG. 14) or different based on the requirements.

Figure 16:
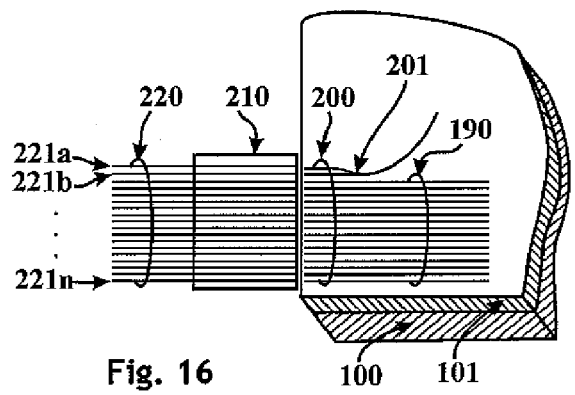
FIG. 16 shows a partial section of the nPIC chip at the fiber array coupling.

Referring to FIG. 16, at the input and output (I/O) segment of the nPIC an external fiber array 210 is used for signal in and out of the nPIC. Arc 220 encircles the individual fibers from 221a, 221b, ..., 221n in the array where the fiber 221a is used to input the pump and usually the fiber 221b is used to input a multiplexed signal into the nPIC. A coupler or combiner 201 is monolithically built on the same chip that combines the pump and the signal and feeds them into the amplifier unit 110. The external fiber array 210 is precisely aligned to the nPIC input/output interface 200 and fixed permanently so that it becomes a part of the packaged module.

FIG. 17 shows the refractive index of G2 PAMAM dendrimer measured with a Metricon 2010 prism coupler (Metricon Inc., Pennington, N.J.). The thicknesses are also measured simultaneously as shown in FIG. 17. The G2 film was formed via spin-coating on prime grade <100> silicon wafer and cured by a procedure as described before. The curing temperature is important to obtain a fully cured film; however, a minimum duration of cure of 30 minutes is required, while a longer duration at this temperature does not make any significant difference in the final film properties. As seen from FIG. 17, cured G2 PAMAM film has an index of 1.6 at 1500 nm, thus used as a core with a suitable cladding, it is suitable for guiding light in the wavelength range of 1000-1600 nm. The PAMAMOS dendrimer has an index of 1.5, thus this can be used as the core material with glass being used as a cladding.

Figure 18:
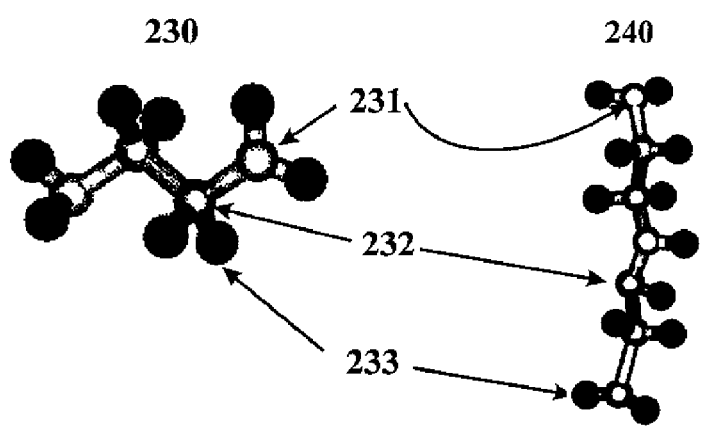
FIG. 18 shows a sketch of molecular structure of ethylene diamine and a substituent.

FIG. 18 shows an ethylene diamine molecule 230 that is used as the central core of the PAMAM dendrimer where a substituent 240 is used to form a zero$^{th}$ generation shell around the core, thus forming a zero$^{th}$ generation PAMAM dendrimer, G0 (FIG. 19); wherein 231 is a nitrogen atom bonded to a carbon atom 232; both also have required number of hydrogen atoms 233 attached to them. PAMAM dendrimers are synthesized by repetitive reaction of these two constituents, viz., the core 230 and the substituent 240.

Figure 19:
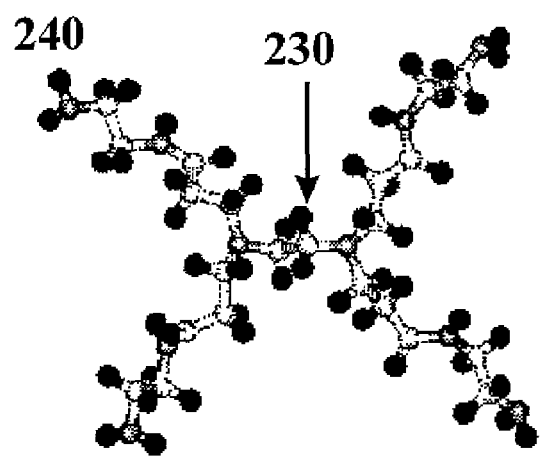
FIG. 19 shows a PAMAM G0 molecule.

FIG. 19 shows a G0 PAMAM dendrimer where 4 substituents have been attached to the core 230 whereby this molecule can chemically bind rare-earth ions and other molecules either to its branch ends or to its core, thus its properties can be tailored for optical amplification and modulation applications. For instance, $Er^3$+ ions can be attached either to the core 230 or to the substituent 240 to obtain amplification in the 1500-1600 nm range. Other rare earth ions can be used to dope the dendrimer to obtain amplification in other wavelength ranges. Additionally, other organic molecules such as chromophores can be attached to the dendrimer molecule to obtain a higher electro-optic response for modulation applications. Moreover, other dielectric and/or inorganic ions can be attached to the dendrimer molecules to obtain a higher dielectric constant of dendrimer films that will be suitable for photonic crystal fabrication (not described here).

Figure 20:
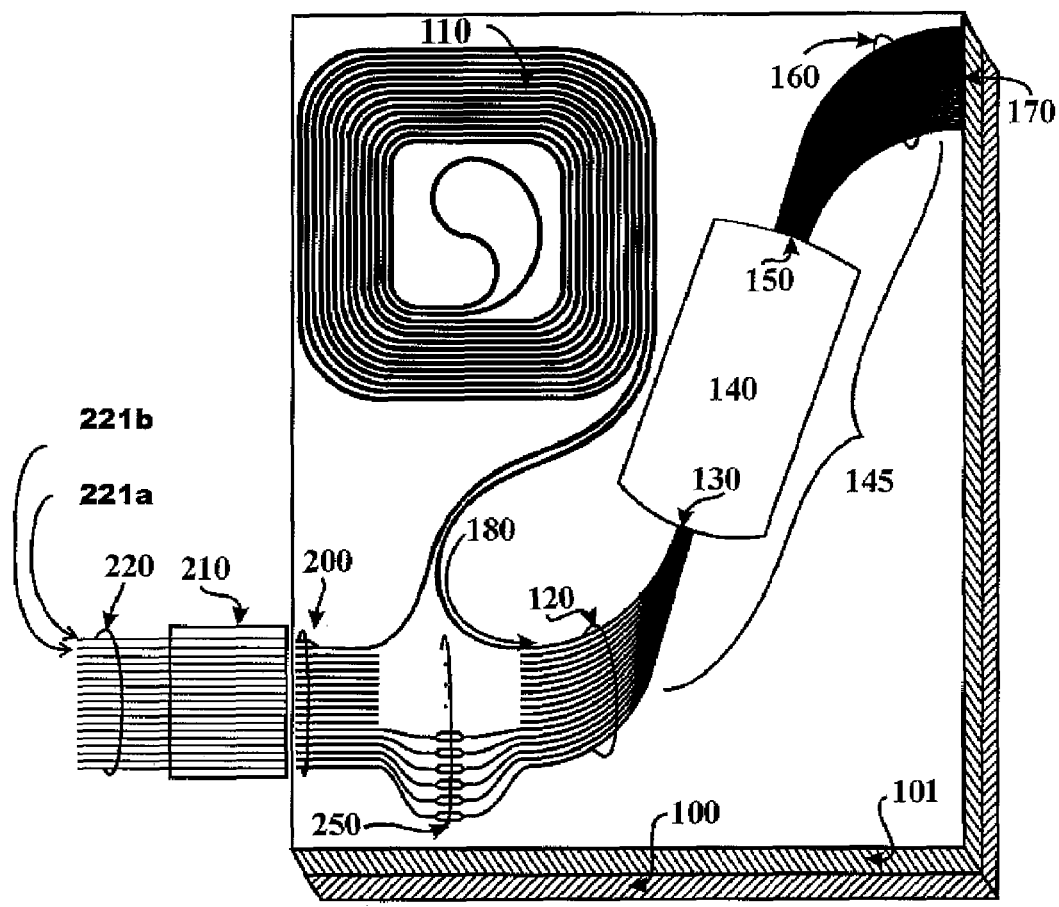
FIG. 20 shows an alternate embodiment of the nPIC of the present invention.
Figure 21:
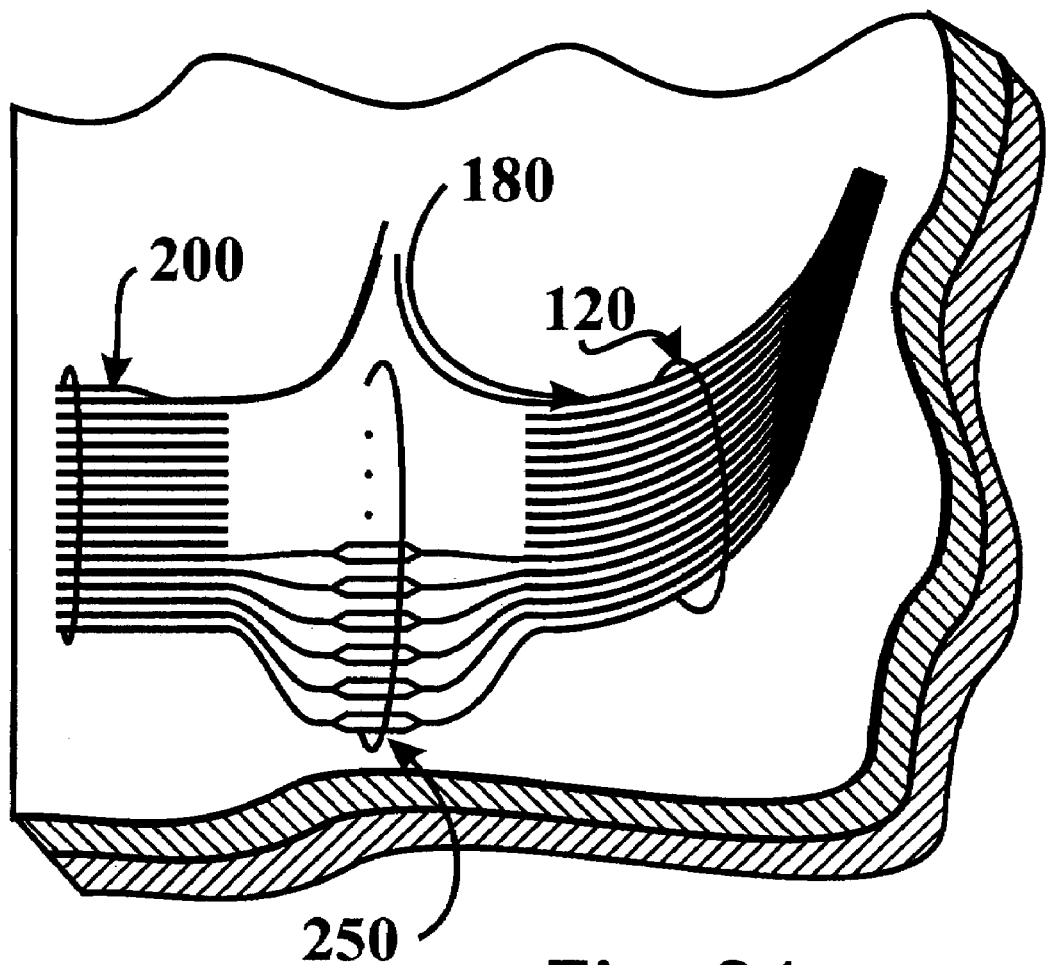
FIG. 21 shows an enlarged sectional view of the modulation segment of the nPIC in FIG. 20.

FIG. 20 shows another preferred embodiment of the nPIC where the modulation unit 250 is constructed of MZ amplitude modulators for each output channel that are connected to the input and output of the nPIC via a monolithic integration of waveguide interconnects fabricated on the same chip. FIG. 21 shows a magnified view of the modulation segment 250 of the nPIC of FIG. 20.

Figure 22:
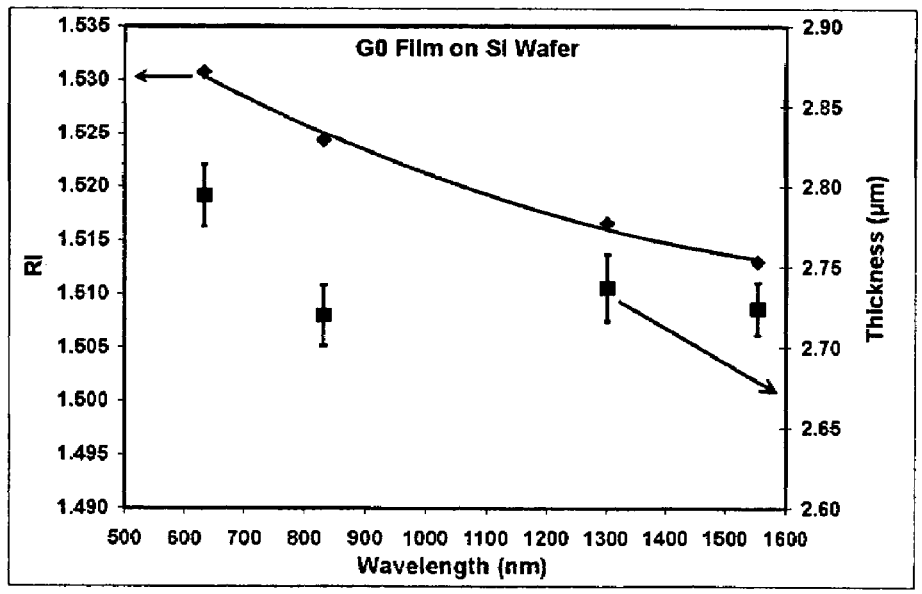
FIG. 22 shows measured refractive index of cured G0 film.

FIG. 22 shows the measured refractive index and thickness of PAMAM G0 film formed on a silicon wafer via spin coating which was cured at ~250° C. for about an hour. Cured G0 film has a lower index than G2 film described before, therefore, can be used as a cladding material.

Figure 23:
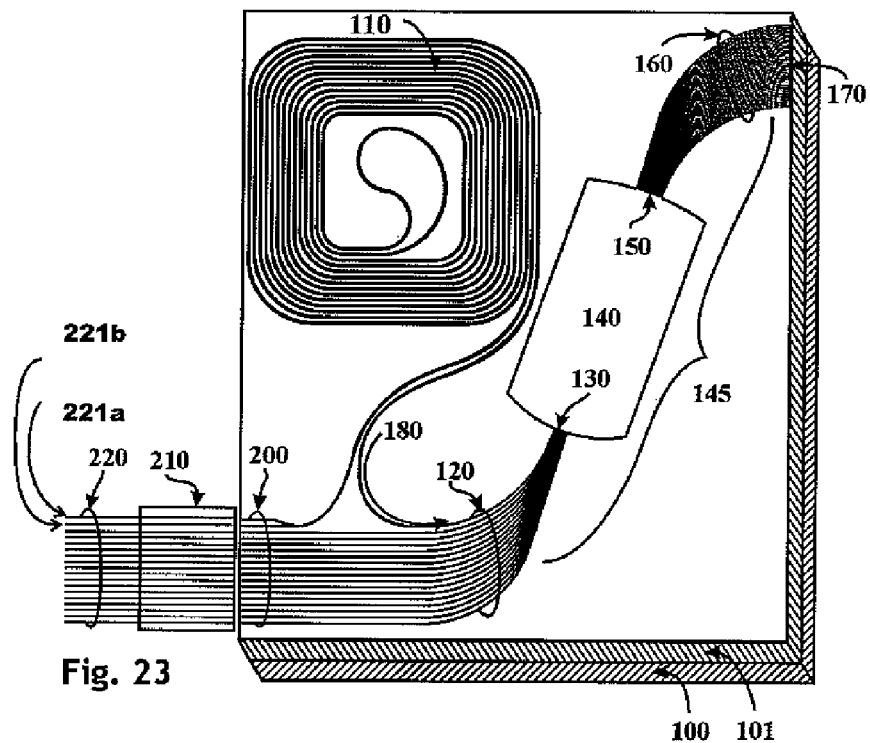
FIG. 23 shows another embodiment of the nPIC with 2nd phase integration.

FIG. 23 shows another preferred embodiment of the nPIC comprising of a "second-phase" integration, where only an amplifier section 110 and a mux/demux section implemented via a RAWG 145 is constructed on the same chip, where input/output array 120 are the input/output channels of RAWG 145. This chip does not have the capability of modulating output signals; it will only amplify and perform multiplexing and demultiplexing of the I/O signals.

Figure 24:
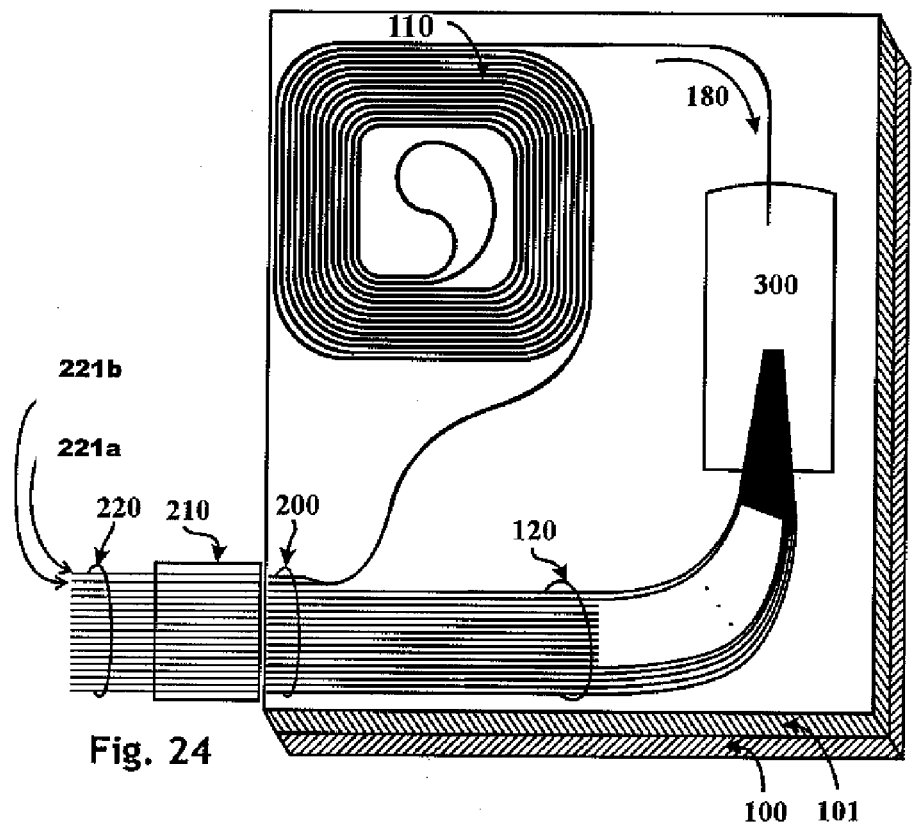
FIG. 24 shows yet another embodiment of the nPIC with another 2nd phase integration.

FIG. 24 shows yet another preferred embodiment of the nPIC that is comprised of an amplifier section 110 and a 1×N splitter section 300 whereby the input signal is first amplified by the amplifier section 110 that is fed into the input of the splitter 300. The splitter 300 then just splits the signal into N branches that are coupled to the output channels.

Figure 25:
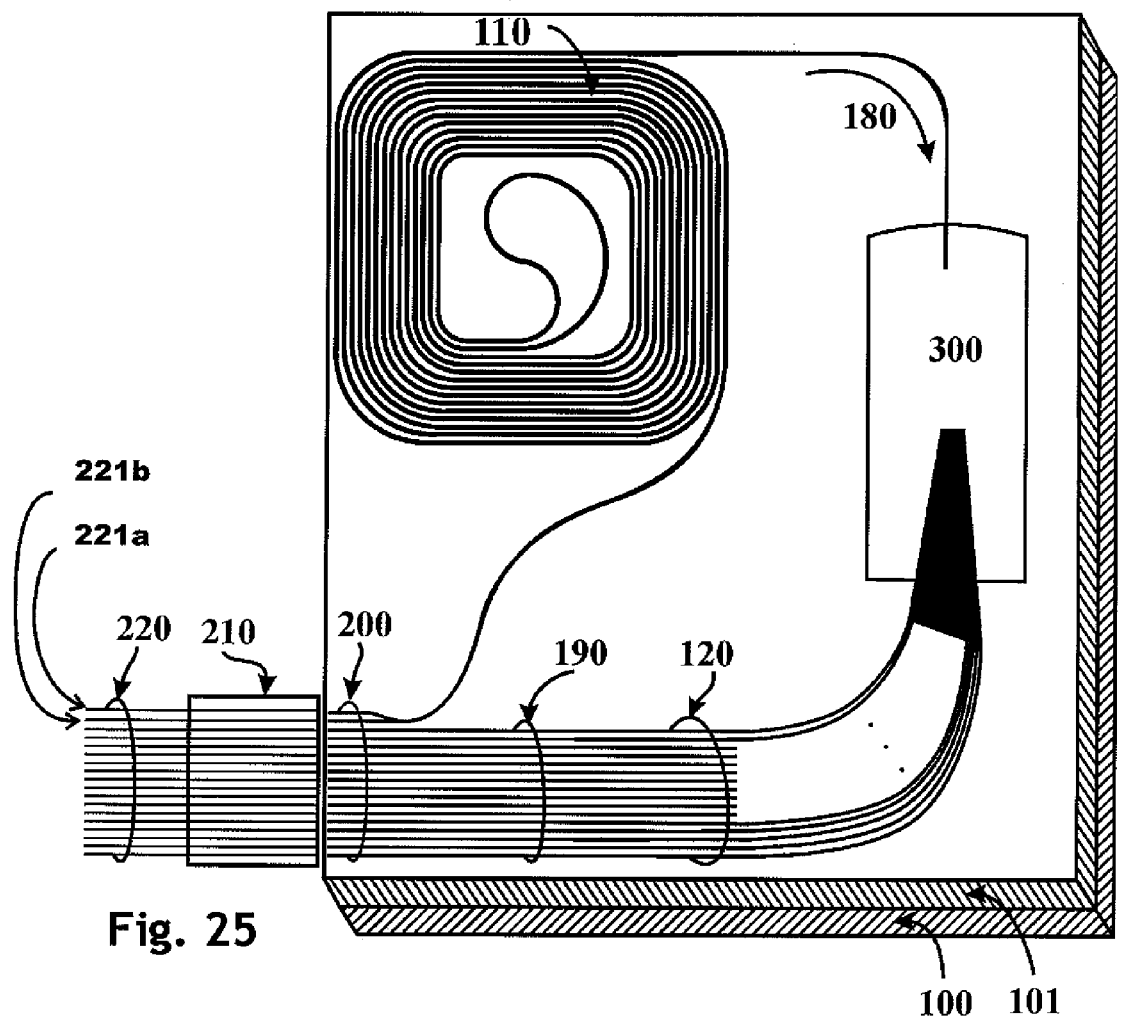
FIG. 25 shows yet another embodiment of the nPIC.
Figure 26:
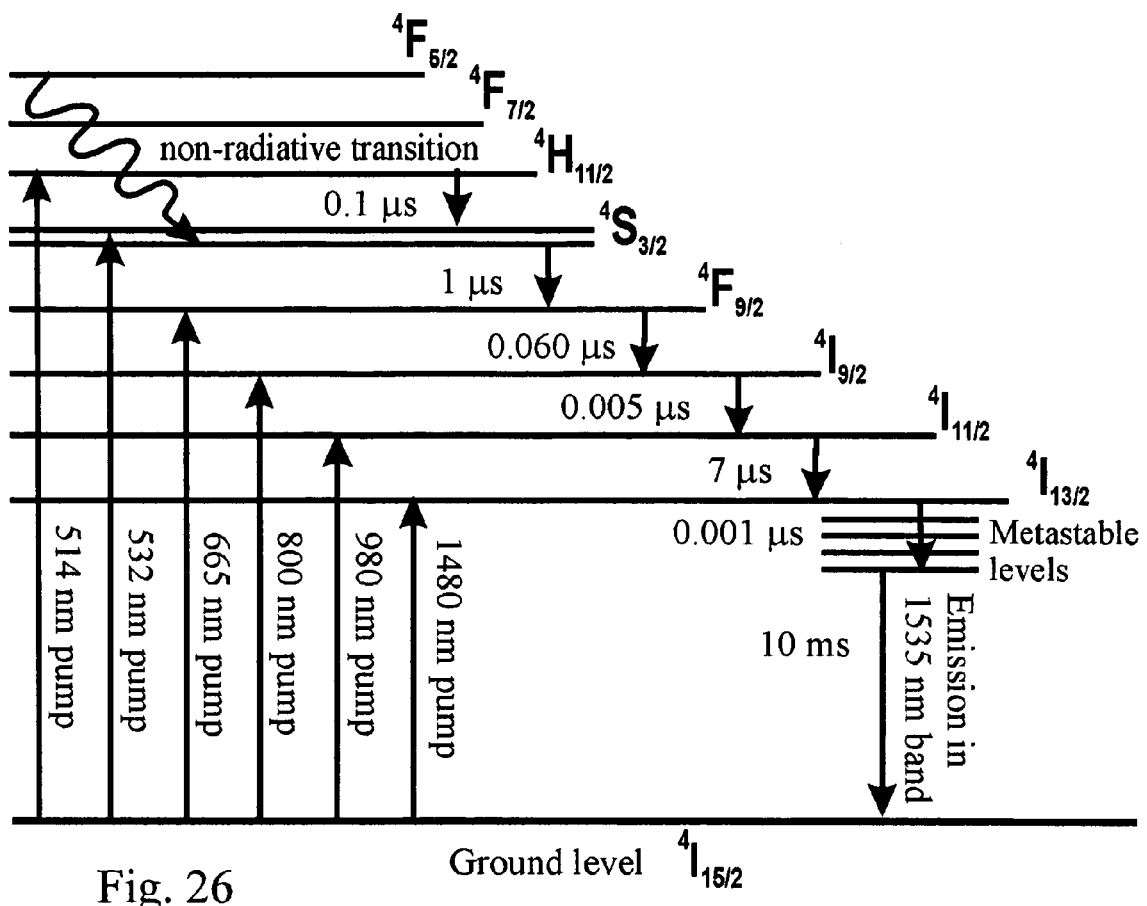
FIG. 26 is an energy level diagram of $Er^{3+}$.

FIG. 25 shows yet another preferred embodiment of the nPIC that is comprised of an amplifier section 110, a 1×N splitter section 300, and a modulator section 190. The nPIC is designed to modulate the output signal coming from the splitter section 300 that was preamplified by the amplifier section 110.

METHODS OF FABRICATING THE ERBIUM DOPED DENDRIMER AMPLIFIER (EDDA)

The first generation of Erbium-doped waveguide amplifiers (EDWAs)—glass-based waveguide amplifiers—used mainly laser diodes emitting at 1480 nm for optical pumping. Under this excitation scheme, the metastable $^4I_{13/2}$ energy level of the erbium ions is excited directly via its high-lying Stark states. The ions act as a quasi-three-level laser system, which limits the population inversion with respect to the ground state to roughly 40% (corresponding to a population in the first excited state of 70%) because of stimulated emission by pump radiation. On the other hand, when pumping into the second excited state $^4I_{11/2}$ using 980 nm radiation, a population inversion between metastable level and ground state of close to 100% can be obtained, therefore, 980 nm pumping is expected to be more efficient.

This 980 nm excitation scheme of $Er^{3+}$ in EDWAs, however, requires considerably higher intensities, since the absorption cross-section of the $^4I_{11/2}$ state is small. In the present invention, the excitation cross-section of $Er^{3+}$ around 980 nm is increased by codoping dendrimer with ytterbium ($Yb^{3+}$). The absorption cross-section of $Yb^{3+}$ at 980 nm is about an order of magnitude larger than that of $Er^{3+}$, and the absorption band of $Yb^{3+}$ extends over a wider wavelength region, between 850 nm and 1000 nm. From $Yb^{3+}$ the energy is then transferred resonantly to the $^4I^{11/2}$ state of $Er^{3+}$. This energy transfer has been investigated in a wide range of materials, both glassy and crystalline [3-7], however, no data has heretofore been available for dendrimer.

Under the present invention, enhanced efficiencies and higher output power are obtained by using high concentrations of $Er^{3+}$, >10,000 ppm (or even >40,000 ppm). It is hypothesized that such high concentrations reduce the problem of ground state bleaching and simultaneously up convert an adjacent ion to a higher energy state which subsequently contributes to emission in the range of interest.

The present invention uses the doping concentration as a parameter to control the amplification efficiency. Hence, the higher the doping level, the higher the amplification per unit length of the waveguide. The lower limit of doping concentration, below which no measurable amplification occurs, may be a few hundred ppm. The upper limit is unknown however, the inventor has demonstrated through simulations that concentrations of at least 40,000 ppm are effective.

Every rare-earth metal has a unique characteristic absorption and emission ranges. This characteristic emission range is the one that will dominate when a higher concentration of this species is present. The characteristic emission of Er is around 1550 nm band. Neodymium ($Nd^{3+}$) will amplify in the 1060 nm range. Praseodymium ($Pr^{3+}$) will amplify in the 1250-1300 nm range, Thorium ($Th^{3+}$) and Holmium ($Ho^{3+}$) will amplify in the 1300-1400 nm range, and Terbium ($Tb^{3+}$) will amplify in the 1400-1500 nm range. Yb is mainly used as a codopant, or sensitizer. In glass, up to 4%Yb has been used. In dendrimer, a percentage greater than 4% is possible.

PAMAM dendrimer of generation 2 (G2), generation 3 (G3), and generation 4 (G4); and PAMAMOS dendrimer of generation 2 (G2'), generation 3 (G3'), and generation 4 (G4'), are doped with Erbium ions ($Er^{3+}$) via liquid phase coordination chemistry or chelating. The PAMAM and PAMAMOS generations are given by way of example and not limitations, and generation zero through generation 10 of each of the PAMAM and PAMAMOS dendrimers can be doped with Erbium ions via the same procedure. In addition to Erbium, this method can also be used to dope dendrimer with other rare-earth ions, leading to a mechanism to tune the wavelength range for amplification.

The dendrimers are preferably standard Generation 2 poly (amido amines) with amine (—NH2) surfaces and a 1,2-ethylenediamine core (theoretical molecular weight: 3252 g/mol). They are synthesized by sequential Michael addition followed by amidation according to procedures known by those skilled in the art.

Erbium-doped dendrimer solutions of the present invention can be prepared by dissolving erbium (III) nitrate pentahydrate in a solution of the dendrimer and methanol. A solution of 500 ppm (parts per million) erbium-doped dendrimer can be prepared by adding $5\times10^{-4}$ g erbium (III) nitrate to 0.5 g dendrimer and 0.5 g methanol. A solution of 1000 ppm erbium-doped dendrimer can be prepared by adding 0.001 g erbium (III) nitrate pentahydrate to 0.5 g dendrimer and 0.5 g methanol. Additionally, a 1% erbium (III) nitrate pentahydrate solution (no dendrimer) can be prepared by dissolving erbium (III) nitrate pentahydrate (0.005 g) in methanol (0.5 g). Although nitrate is the disclosed compound, other compounds such acetate, halides, isopropoxide, oxalate, phosphate hydrate, sulfate hydrate, and other similar Erbium compounds that are soluble in organic solvents, for example, methanol, isopropanol, toluene methoxypropanol, and similar compounds. Other concentrations can also be obtained following this method.

While the invention has been described with reference to a few preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A nanophotonic integrated circuit comprising:
an input section, an amplifier section and a multiplexing/demultiplexing unit arranged on a substrate;
the input section having a plurality of input waveguides, a coupler portion for coupling two of the plurality of input waveguides to the amplifier section, and a remaining input waveguides being connected to the multiplexing/demultiplexing unit,
the amplifier section having a continuous folded waveguide connected at a first end to the coupler portion of the input waveguide and connected at a second end to the multipiexing/demultiplexing unit;
the multiplexing/demultiplexing unit having a plurality of input/output waveguides, a slab waveguide, an array waveguide, and a reflective mirror;
the plurality of input/output waveguides arranged for simultaneously inputting at least one signal to and outputting at least one signal for demultiplexing a multiplexed optical signal in to n different constituent wavelengths and for combining n input optical signals composed of n different constituent wavelengths in to a multiplexed signal;
the slab waveguide having a first end and a second end, the first end coupled to the plurality of input/output waveguides to focus the at least one input signal to the second end, and the second end coupled to the array waveguide, for focusing the at least one output signal to the input/output interface through the first end;
the array waveguide comprising a plurality of waveguides for coupling the one or more input signals, separating the one or more input signals into the n different constituent wavelengths and focusing the n different constituent wavelengths back on to the slab waveguide first end coupling to the input/output interface, the plurality of waveguides of the array waveguide being optically coupled at one end with the second end of the slab waveguide, and
terminated at an opposing end of the array waveguide by the reflective mirror, each waveguide of said array waveguide having a predetermined path difference between successive waveguides, and
the reflective mirror disposed at the opposing end of the array waveguide for reflecting the one or more signals.

2. The nanophotonic integrated circuit of claim 1, wherein also includes an external array interface portion attached to the input section, for connecting external fibers for input and output of signals to the nPIC.

3. The nanophotonic integrated circuit of claim 1, wherein the external array interface portion is precisely aligned to the input section and fixed to a side of the nanophotonic integrated circuit as part of a packaged module.

4. The nanophotonic integrated circuit of claim 1, wherein the amplifier section having a core comprised of a dendrimer material doped with amplifying ions.

5. The nanophotonic integrated circuit of claim 4, wherein the amplifying ions are selected from the group consisting of $Er^{3+}$, $Yt^{3+}$ and similar rare earth ions.

6. The nanophotonic integrated circuit of claim 1, wherein the continuous folded waveguide is composed of a plurality of straight segments and a plurality of curved segments, wherein the curved segments have a predetermined minimum radius of curvature.

7. The nanophotonic integrated circuit of claim 6, wherein R is in the range of about 1 to 6 millimeters for dendrimer polymeric material and from about 4 to 5 mm for glassy materials.

8. The nanophotonic integrated circuit of claim 1, wherein each waveguide of the array waveguide is tapered at one end adjacent to the reflective mirror to couple light into and out of the array waveguide.

9. The nanophotonic integrated circuit of claim 8, wherein each waveguide of the array waveguide is tapered at an opposing end adjacent to the slab waveguide.

10. The nanophotonic integrated circuit of claim 1, also including a modulator array portion comprised of at least one modulator configured to modulate at least one input/output signals from the input/output waveguides, the modulator array being connected between the input/output waveguides and the multiplexing/demultiplexing unit.

11. The nanophotonic integrated circuit of claim 10, wherein the at least one modulator of the modulator array portion is an electro-optic phase modulator configured so that an electric excitation can be applied across the modulator over a predetermined length.

12. The nanophotonic integrated circuit of claim 11, wherein the electro- optic phase modulator includes a top electrode and a bottom electrode, the separation between the top and the bottom electrodes being within a range of about 2 to 8 microns.

13. The nanophotonic integrated circuit of claim 10, wherein the at least one modulator of the modulator array portion is a Mach-Zehnder (MZ) structure, wherein each MZ structure includes a pair of phase modulators arranged in parallel to produce amplitude modulation.

14. The nanophotonic integrated circuit of claim 10, wherein the modulators of the modulator array portion have a transmittance that can be controlled from a minimum power $P_{min}$ to a maximum power $P_{max}$, and output power, $P_{out}$ can be controlled by the applied voltage V according to the following equation:

$$P_{out} = P_{min} + (P_{max} - P_{min}) \cdot \left[ \frac{1}{2} + \frac{1}{2} \cos\left\{ \frac{\pi(V - V_0)}{V_\pi} \right\} \right]$$

where $V_0$ is the voltage at peak power, $V_\pi$ is the half-wave voltage, and V is the applied voltage.

15. The nanophotonic integrated circuit of claim 10, wherein the modulator array portion is comprised of a combination of electro-optic phase modulators and MZ amplitude modulators.

16. The nanophotonic integrated circuit of claim 10, wherein the modulator array portion is comprised of a plurality of MZ amplitude modulators, each MZ amplitude modulator corresponding to an output channel of the integrated circuit.

17. The nanophotonic integrated circuit of claim 1, wherein the input section, amplifier section and multiplexing/demultiplexing unit are comprised of a PAMAM dendrimer material suitable for guiding light in the range of approximately 1000 to 1600 nanometer range, the PAMAM dendrimer being selected from the group consisting of generation zero through generation 10.

18. The nanophotonic integrated circuit of claim 1, wherein the input section, amplifier section and multiplexing/demultiplexing unit are comprised of PAMAMOS dendrimer material suitable for guiding light in the range of approximately 1000 to 1600 nanometer range, the PAMAMOS dendrimer being selected from the group consisting of generation zero through generation 10.

19. A nanophotonic integrated circuit comprising:
    an input section, an amplifier section and a splitter section arranged on a substrate; the input section configured to connect an input signal to the amplifier section, the amplifier section being configured to amplify the input signal and transmit the amplified input signal into an input of the splitter section; and the splitter section is coupled to a plurality of output channels configured to split the amplified input signal into a plurality of output signals of N branches, wherein the amplifier section is comprised of a dendrimer material.

20. The nanophotonic integrated circuit of claim 19, also including a modulator section, wherein the modulator section is configured to modulate the plurality of output signals.

21. A method for tuning the wavelength ranges for amplification in an optical circuit, comprising:
    doping a dendrimer material with at least one of a preselected rare-earth ion; dissolving a salt of the preselected rare earth ion in a solution of the dendrimer and methanol; and
    amplifying light waves in a range which is characterized by the 1500-1600 nm range.

22. The method of claim 21, wherein the dendrimer is doped by using concentrations of $Er^{3+}$, in the range of about 200 ppm to about 40,000 ppm.

23. The method of claim 21, wherein the rare earth ions are selected from the group consisting of Erbium for amplifying light waves in the 1500-1600 nm range, Neodymium ($Nd^{3+}$) for amplifying light waves in the 1060 nm range, Praseodymium ($Pr^{3+}$) for amplifying light waves in the 1250-1300 nm range, Thorium ($Th^{3+}$) for amplifying light waves in the 1300-1400 nm range, Holmium ($Ho^{3+}$) for amplifying light waves in the 1300-1400 nm range, and Terbium ($Tb^{3+}$) for amplifying light waves in the 1400-1500 nm range.

* * * * *